Figure 3:
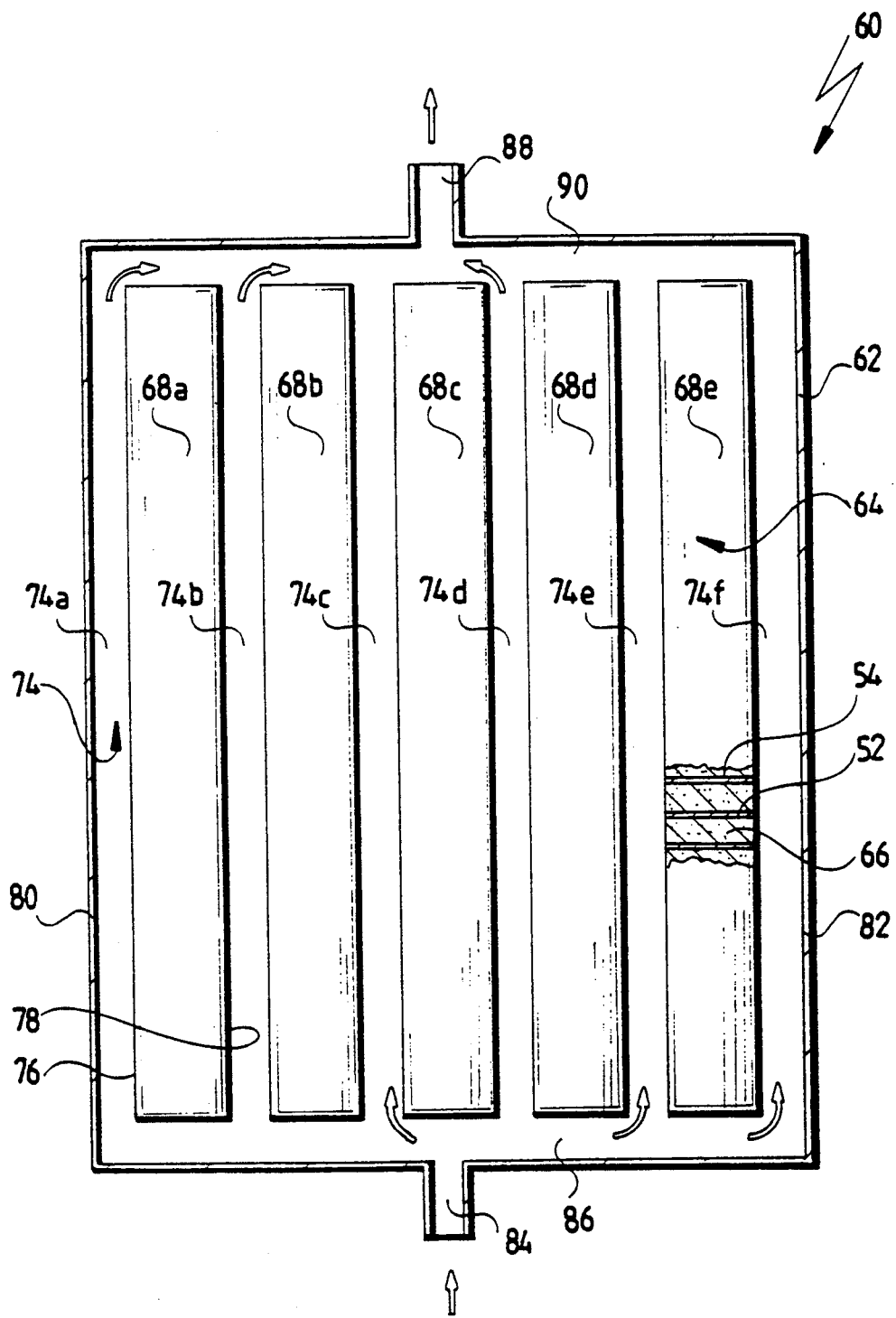

United States Patent
Tamme et al.

[11] Patent Number: 5,184,669
[45] Date of Patent: Feb. 9, 1993

[54] HEAT ACCUMULATOR WITH CHEMICAL SOLID MATTER/GAS STORAGE REACTIONS

[75] Inventors: Rainer Tamme, Ostfildern; Herbert Kanwischer, Stuttgart, both of Fed. Rep. of Germany

[73] Assignee: Deutsche Forschungsanstalt fuer Luft- und Raumfahrt e.V., Fed. Rep. of Germany

[21] Appl. No.: 598,600

[22] PCT Filed: Feb. 9, 1990

[86] PCT No.: PCT/EP90/00205
§ 371 Date: Oct. 18, 1990
§ 102(e) Date: Oct. 18, 1990

[87] PCT Pub. No.: WO90/10181
PCT Pub. Date: Sep. 7, 1990

[30] Foreign Application Priority Data
Feb. 22, 1989 [DE] Fed. Rep. of Germany ....... 3905346

[51] Int. Cl.$^5$ .............................................. F28D 20/00
[52] U.S. Cl. .................................. 165/10; 165/104.12; 62/480
[58] Field of Search ............... 165/104.12, 10; 62/478, 62/480, 271

[56] References Cited

U.S. PATENT DOCUMENTS

| | | | |
|---|---|---|---|
| 3,987,786 | 10/1976 | Keyes et al. | |
| 4,099,558 | 7/1978 | Bricard et al. | 165/10 |
| 4,227,375 | 10/1980 | Tompkins | 62/271 |
| 4,403,643 | 9/1983 | Minto | 165/104.12 |
| 4,461,339 | 7/1984 | Sizmann | 165/104.12 |
| 4,484,617 | 11/1984 | Sizmann | 165/104.12 |
| 4,535,837 | 8/1985 | Ishii et al. | |

FOREIGN PATENT DOCUMENTS
3130671 2/1983 Fed. Rep. of Germany .

Primary Examiner—Albert W. Davis, Jr.
Attorney, Agent, or Firm—Barry R. Lipsitz

[57] ABSTRACT

An improved heat accumulator based on chemical solid/gas storage reactions is provided. A solid/gas reaction storage material resides in a container which can be charged and discharged by means of a heat carrier gas. Thus, through chemical reaction, a reaction component is released or absorbed. In order to provide the simplest structure possible with minimal loss of useful energy, the storage material is arranged in the container in a continuously apportioned configuration and such that the heat carrier gas flows directly around it. The reaction components are released into or drawn from the region through which the heat carrier gas flows.

19 Claims, 3 Drawing Sheets

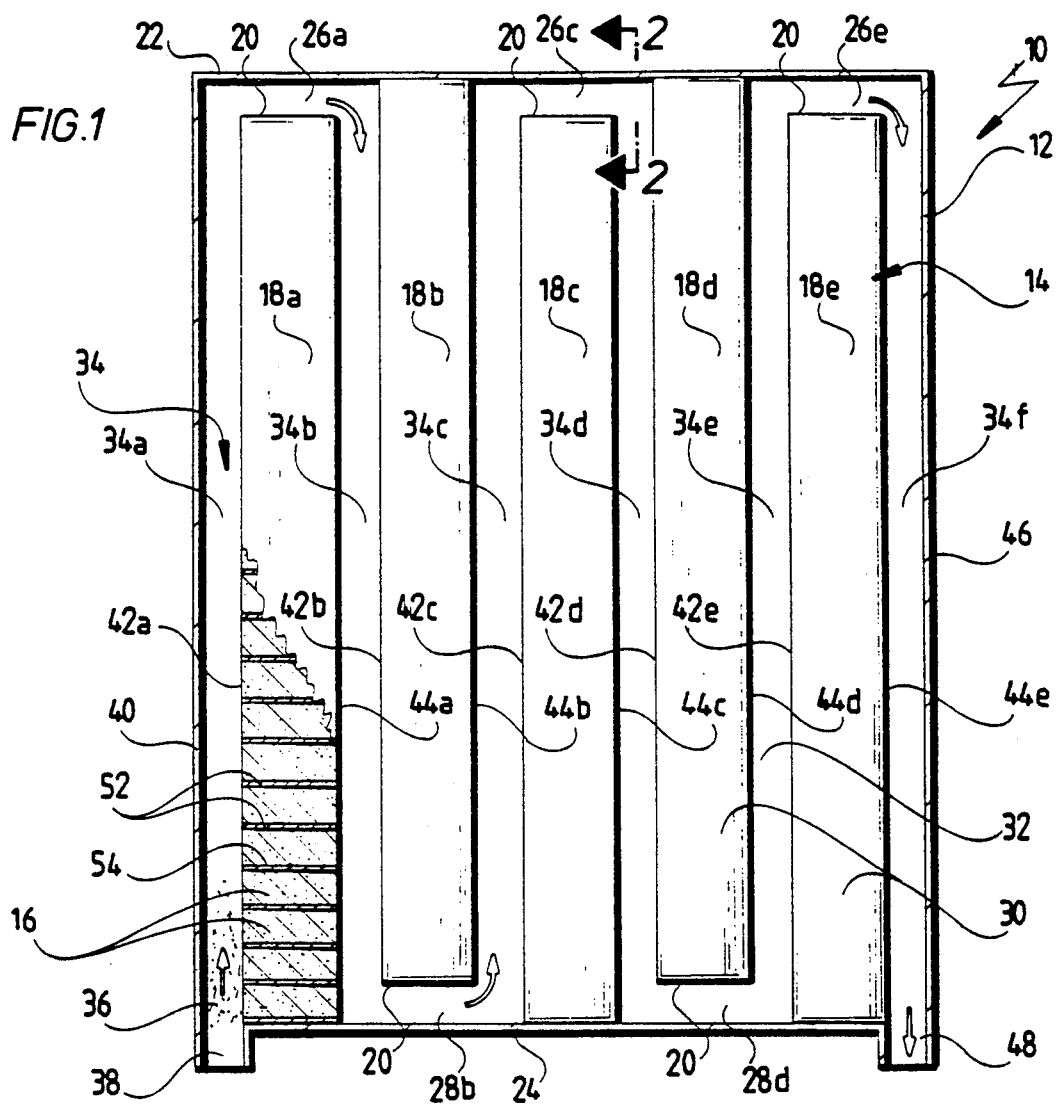
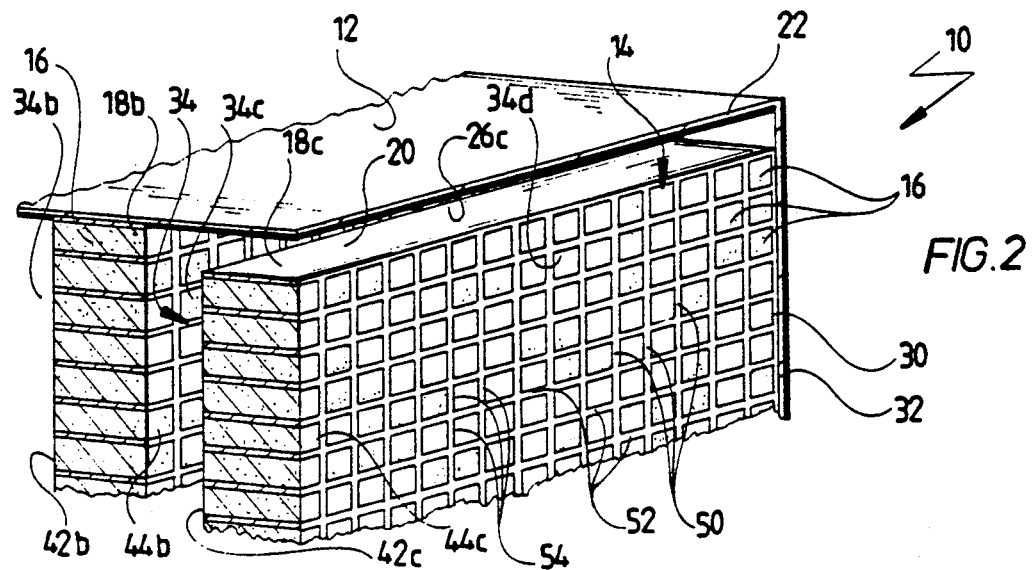

HEAT ACCUMULATOR WITH CHEMICAL SOLID MATTER/GAS STORAGE REACTIONS

The invention relates to a heat accumulator operating with chemical solid matter/gas storage reactions and comprising a solid matter/gas reaction storage material arranged in a container and being chargeable and dischargeable by means of a heat carrier gas, thereby respectively releasing and taking in a reaction component by chemical reaction.

In such accumulators with chemical storage reactions of hitherto design, a heat carrier circuit was provided for the charging and discharging of the accumulator but transportation of the reaction component was separate from the heat carrier gas circuit. These solutions all have the disadvantage that they involve high losses of useful energy, additional supplementary energy, considerable material expenditure and, finally, also a reduced filling factor so such chemical accumulators are, in the end, economically uninteresting.

The object underlying the invention is, therefore, to so improve a heat accumulator with chemical solid matter/gas storage reactions that it is economically interesting, i.e., in particular, that it can be implemented with as low structural expenditure as possible and, in addition, exhibits low losses of useful energy.

This object is accomplished in accordance with the invention with a heat accumulator of the kind described at the beginning by the storage material being permanently arranged in the container in a configuration in which it is divided into portions with the heat carrier gas flowing directly around it, and the storage material giving off the reaction component into and taking it in from the space through which the heat carrier gas flows.

In this way, above all, the loss of useful energy referred to at the beginning was avoided. In addition, a solution was provided which is very simple from a structural viewpoint and also allows a high filling factor.

A zeolite accumulator with a flow occurring directly around the storage material is known from DE-A-31 30 671. However, the zeolite accumulators are adsorption/desorption accumulators and not chemical accumulators.

The characteristic features of chemical accumulators are significant changes in mass and volume during the respective charging and discharging reaction. For example, the changes in volume lie in the order of magnitude of between 25 and 55%. This is accompanied by a change in the physical properties of the storage material. A granulated material as used in zeolite accumulators, would, if used as cut material, be compacted into a block after a few cycles.

Therefore, in order to ensure an effective exchange of the reaction component with the heat carrier gas, provision is advantageously made for the storage material disposed in a configuration in which it is divided into portions to be arranged in a support structure which is open towards the heat carrier gas. This support structure offers the possibility of arranging the storage material such that it exhibits as large a surface as possible towards the heat carrier gas and hence an effective exchange of the reaction component is possible even with very great changes in volume and properties.

In a structurally particularly simple and advantageous variant of such a support structure open towards the heat carrier gas, provision is made for the support structure to comprise adjacent compartments separated by walls with the storage material arranged therein in the configuration in which it is divided into portions. These compartments which may, for example, be arranged in honeycomb-like or similar design, enable the storage material to be arranged in a very expedient manner such that the heat carrier gas flows around it.

It has proven particularly advantageous for the compartments to be adapted for the heat carrier gas to flow through them so the exchange of the reaction component does not take place by diffusion in one direction only, but in several directions.

The simplest structural solution for such compartments makes provision for the compartments to have openings on opposite sides thereof which are then filled either completely or at least partially with the storage material.

Above all, when the support structure includes several elements comprising compartments, the surface of the storage material exposed to the heat carrier gas can be enlarged in a very favorable way.

It is particularly expedient for the elements to have the heat carrier gas flow around them and for it to thereby contact them on all sides thereof.

A preferred solution makes provision for the elements to be arranged in spaced relation to one another in the container so they form between them channels through which the heat carrier gas then flows.

One possibility for these channels to have the heat carrier gas flow through them makes provision for the elements to form labyrinth-like channels for the heat carrier gas between them so as to obtain an effective exchange of the reaction component between the heat carrier gas and the storage material with as large a surface as possible. It is particularly advantageous for the elements to have the heat carrier gas flow around them one after the other so that with a predetermined flow velocity of the heat carrier gas, the period of time during which an exchange of the reaction component can take place between the heat carrier gas and the storage medium is as long as possible.

As an alternative to this, it is, however, also possible for the elements to have the heat carrier gas flow around them parallel to one another.

In the description of the embodiments so far, nothing was said about how the support structure is to be advantageously designed. In an advantageous embodiment, it is conceivable for the support structure to be made of ceramic material, preferably of a honeycomb ceramic material.

As an alternative to this, it is, however, also possible for the support structure to be made of metal.

Nor have any details been given so far regarding the storage material. Provision is preferably made for the storage material to have such properties that the reaction component can condense at room temperature so it can be removed from the heat carrier gas in a simple way.

Particularly preferred embodiments make provision for the storage material to comprise alkaline oxides or alkaline earth oxides in the charged state or alkaline hydroxides or alkaline-earth hydroxides in the discharged state so the reaction component given off to the heat carrier gas or taken in from the latter is water.

In the variants of the inventive heat accumulator presented so far, it was not explained how the heat accumulator is to be advantageously designed so as to remove the reaction component from or feed it to the heat carrier gas.

A preferred embodiment makes provision for the heat carrier gas emerging from the container during the charging of the storage material to be conducted via a condenser for the reaction component so that the reaction component can be removed in a simple way with the condenser.

It is, furthermore, advantageous for the heat carrier gas fed to the container during the discharging of the storage material to flow through a supply device for the reaction component arranged ahead of the container so the reaction component, for example, in gaseous form, can be added via this supply device to the heat carrier gas which then transports it into the container.

As an alternative to the last-mentioned design of the heat accumulator, it is, however, also conceivable to provide a supply device with which the reaction component is introducible into the container during the discharging, i.e., for example, the condensed reaction component is introduced into the container itself in the form of a spray.

To avoid heat carrier gas losses, it is particularly advantageous within the scope of the present invention for the heat carrier gas to be conducted in a circuit and for the reaction component to be removable from and addable to the heat carrier gas in this circuit.

Figure 4:
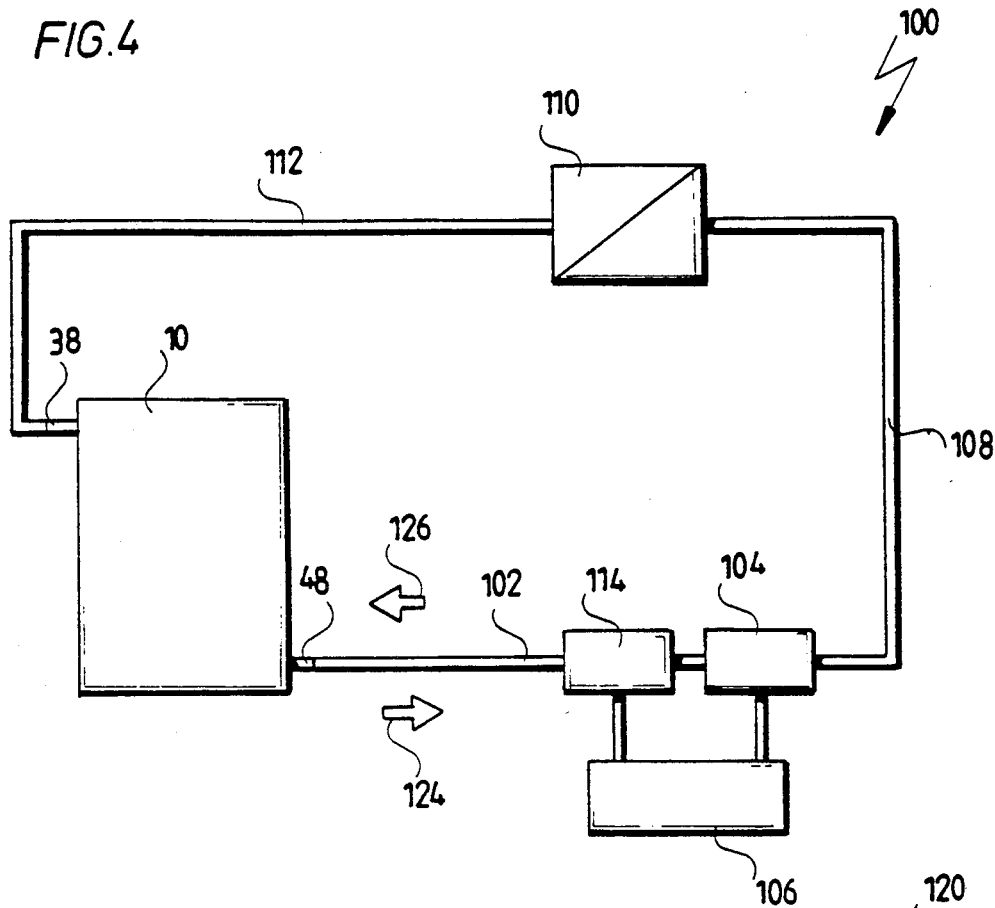
Figure 5:
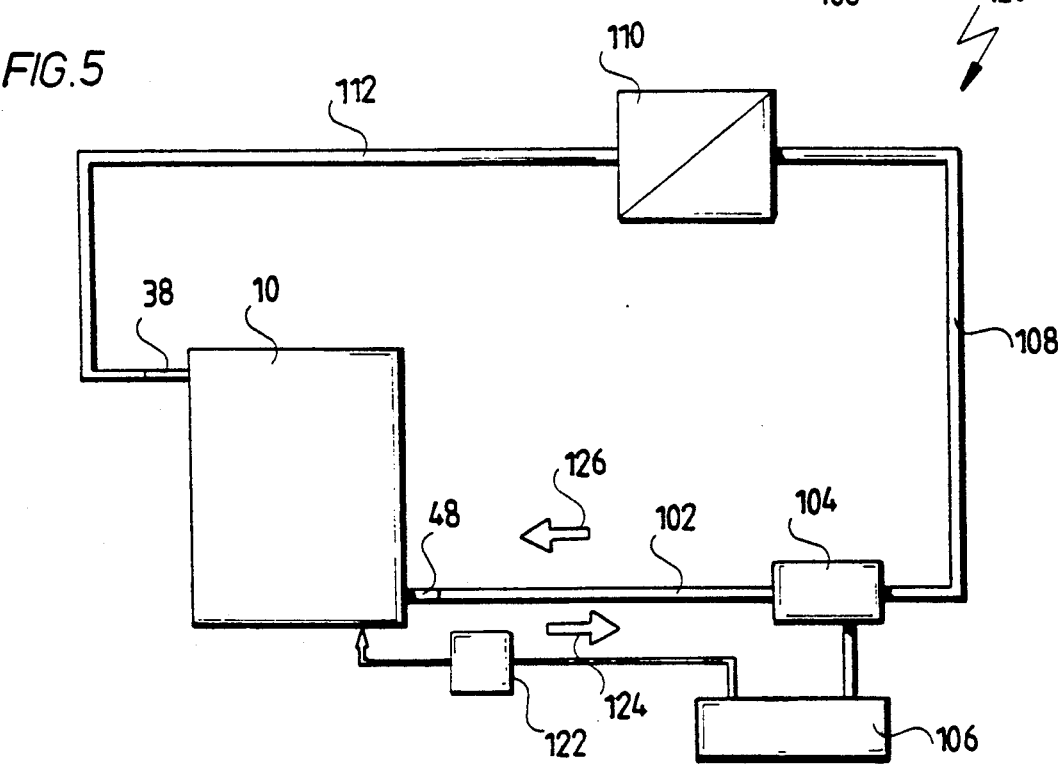

Further features and advantages of the inventive solution are the subject matter of the following description and the drawings of several embodiments. The drawings show:

FIG. 1 a first embodiment of an inventive heat accumulator;

FIG. 2 a perspective illustration of a partial section through the heat accumulator according to FIG. 1;

FIG. 3 a second embodiment of an inventive heat accumulator;

FIG. 4 a schematic illustration of the first embodiment of the inventive heat accumulator, supplemented by a circulatory system for the heat carrier gas; and FIG. 5 an illustration similar to FIG. 4 of the first embodiment, supplemented by a variant of the circulatory system according to FIG. 4.

A first embodiment of an inventive heat accumulator designated in its entirety 10 comprises a storage container 12 inside of which a support structure designated in its entirety 14 is arranged for accommodating a solid matter storage material 16. This support structure 14 comprises several elements 18a to e which are arranged in the storage container 12 so as to form partitions therein, with a gap 26 or 28 remaining between an edge region 20 and a side wall 22 or 24 of the storage container 12 facing this edge region 20, while the elements 18a to e rest with their remaining edge regions 30 against the side walls 24, 22 or 32 of the storage container 12.

The elements 18a to e are, furthermore, arranged in parallel, spaced relation to each other in the storage container 12 so a zig-zag channel 34 for a heat carrier gas 36 is formed in the storage container 12—as may be seen, in particular, in FIGS. 1 and 2. Starting from a first connection 38, a first section 34a of the channel 34 extends between an end wall 40 of the storage container 12 and an end face 42a of element 18a as far as the gap 26. Following the gap 26a, a section 34b extends between an end face 44a of element 18a opposite the end face 42a and an end face 42b of element 18b as far as the gap 28b, after this a section 34c between the end face 44b of element 18b and the end face 42c of element 18c as far as a gap 26c, then again a channel 34d as far as a gap 28d and from this a channel 34e as far as a gap 26e, from which a last section 34f then leads between the end wall 46 opposite the end wall 40 and the end face 44e to a second connection 48.

As may be seen, in particular, from FIG. 2, the elements 18a to e are constructed so as to comprise a plurality of parallel walls 50 and a plurality of walls 52 extending perpendicularly to the walls 50, thereby together forming compartments 54 of right parallelepiped shape which are open towards the end faces 42 and 44, in FIG. 2 42c and 44c. The storage material 16 is then arranged in these compartments 54, thereby preferably filling the compartments 54 partially or completely.

Hence an exchange of the reaction component to be given off into or taken in from the heat carrier gas 36 can take place between the heat carrier gas 36 flowing through the channel 34 and the storage material 56 via the end faces 42 and 44 of elements 18.

A second embodiment of the inventive heat accumulator, designated in its entirety 60, illustrated in FIG. 3, likewise comprises a storage container 62 in which there is arranged a support structure 64 which likewise includes a plurality of elements 68 arranged parallel to one another for accommodating the solid matter storage material 66.

In contrast with the first embodiment, the elements 68a to e are arranged in such spaced relation to one another that they form a plurality of parallel channels 74a to f which are delimited by the end faces 76 and 78 of the elements 68a and e and in the case of elements 68a and e also by the end walls 80 and 82 and lead from a first transverse channel 86 connected to a first connection 84 to a second transverse channel 90 connected to a second connection 88.

As shown in FIG. 4, both the first embodiment 10 and the second embodiment 60 of the inventive heat accumulator may be additionally provided with a circulatory system 100. For reasons of simplicity, it will be assumed that the first embodiment 10 of the inventive heat accumulator is used in FIG. 4.

The circulatory system 100 leads from the second connection 48 of the heat accumulator 10 with a pipe 102 to a condenser 104 which is designed so as to be capable of condensing the reaction component given off into the heat carrier gas 36 and delivering it to a condensate container 106 connected to the condenser 104. The condenser 104 preferably has cooled surfaces on which the reaction component carried along by the heat carrier gas 36 can settle and condense and be collected, for example, via a collecting vessel and fed to the condensate container 106.

A pipe 108 leads from the condenser 104 to a heat couple-in-and-out unit 110 which in the simplest case can be a heat exchanger. The heat couple-in-and-out unit 110 may, however, also be designed so as to have two different paths for the heat carrier gas 36, with one path leading via a unit for heating the heat carrier gas and the other via a unit for cooling the heat carrier gas.

A pipe 112 leads, in turn, from the heat couple-in-and-out unit 110 to the first connection 38 of the first embodiment 10 of the inventive heat accumulator provided with a circulatory system 100.

Additionally installed in the pipe 102 is an evaporator 114 which is connected to the condensate container 106 and is capable of removing condensate of the reaction component from the latter and then supplying it in evaporated form to the heat carrier gas 36 flowing in the pipe 102.

In a combination of the first embodiment 10 of an inventive heat accumulator with a variant 120 of the circulatory system 100, the difference over the latter resides in provision of a condensate injector 122 instead of the evaporator 114 for removing condensate of the reaction component from the condensate container 106 and injecting it directly into the storage container 12, for example, in the form of a spray. Such condensate injection can be carried out either exclusively in the region of the connection 48 or at several points along the channel 34, i.e., in particular, in the region of the gaps 26 and 28 in order to achieve uniform distribution of the condensate in the storage container 12.

The inventive heat accumulator according to the first embodiment provided with a circulatory system 100 or 120 is operated during the charging by the heat carrier gas 36 being circulated in the circuit in the direction of arrow 124, i.e., it is supplied to the storage container 12 through the first connection 38 and removed via the second connection 48, then conducted via the pipe 102 to the condenser 104, via the pipe 108 to the heat couple-in-and-out unit 110 and then via the pipe 112 to the first connection 38 again. The heat carrier gas 36 is heated by the heat couple-in-and-out unit 110 so it enters the storage container 12 at a high temperature, heats up the storage material 16 therein and hence causes the latter to give off the reaction component to the heat carrier gas directly into the channel 34 via the end faces 42 and 44 of the elements 18. The heat carrier gas 36 then carries the reaction component along with it in the form of a gas via the pipe 102 to the condenser 104.

In the condenser 104, the gaseous reaction component condenses and is fed to the condensate container 106 so the heat carrier gas 36 which has now been freed of the reaction component is, in turn, conducted via the pipe 108 to the heat couple-in-and-out unit 110, is heated therein and then enters the storage container 12 again. This process is carried out until the storage material 16 has substantially released the reaction component contained in it. In this state, the storage material 16 is charged.

For discharging, the storage material 16 is fed the reaction component in either gaseous or liquid form. To this end, in the circulatory system 100 the condensed reaction component is removed from the condensate container 106 and evaporated in evaporator 114, with the heat carrier gas preferably circulating in the direction of arrow 126, i.e., in the direction opposite to direction 124, in the circulatory system 100. The reaction component which has thus been converted to the gaseous state in evaporator 114 now travels together with the heat carrier gas 36 via the second connection 48 into the storage container 12 and interacts therein with the storage material 16 via the end faces 42 and 44 of the elements 18 so as to react with the storage material 16 and thereby give off heat. This heat developing in the storage material 16 can now be taken away via the heat carrier gas 36 through the first connection 38 and conducted via the pipe 112 to the heat couple-in-and-out unit 110 in which the heat energy is removed from the heat carrier gas 36 so the cooled heat carrier gas again flows via pipe 108 through condenser 104, which in this case has no function, to the evaporator 114 and in the latter again takes the gaseous reaction component along with it.

With the circulatory system 120, circulation of the heat carrier gas likewise takes place in the direction of arrow 126 during the discharging of the storage material 16, i.e., in the direction opposite to direction 124, with the condensate injector 122 introducing the condensed reaction component directly into the storage container, for example, in the form of a spray which is then, in turn, distributed by the heat carrier gas 36 through the storage container 12 and reacts with the storage material via the end faces 42 and 44 of elements 18 so the storage material 16 heats up again. The developing heat is likewise conducted by the heat carrier gas 36 via the pipe 112 to the heat couple-in-and-out unit 110 in which the heat energy is then removed from the heat carrier gas.

All of the embodiments described herein preferably operate with a storage material which is listed in the appended Table 1. These are alkaline oxides and hydroxides and alkaline-earth oxides and hydroxides which are all to be heated above the indicated temperature T during the charging and thereby give off gaseous water as reaction component which can subsequently condense in condenser 104. As can be taken from the indicated temperatures T, such storage materials have the advantage that they are capable of accumulating energy at very high temperatures and releasing it again.

With such storage materials, ceramic materials or metals are preferably used as materials for the support structure 14, i.e., in particular, for the walls 50 and 52 of the elements 18.

TABLE 1

| | T [K.] |
|---|---|
| $Mg(OH)_2 \rightleftharpoons MgO + H_2O$ (gas) | 529 |
| $Ca(OH)_2 \rightleftharpoons CaO + H_2O$ (gas) | 747 |
| $Sr(OH)_2 \rightleftharpoons SrO + H_2O$ (gas) | (910) |
| $Ba(OH)_2 \rightleftharpoons BaO + H_2O$ (gas) | (1060) |
| $LiOH \rightleftharpoons \frac{1}{2}Li_2O + \frac{1}{2}H_2O$ (gas) | 972 |
| $NaOH \rightleftharpoons \frac{1}{2}Na_2O + \frac{1}{2}H_2O$ (gas) | 1370 |
| $KOH \rightleftharpoons \frac{1}{2}K_2O + \frac{1}{2}H_2O$ (gas) | (1550) |

We claim:
1. Heat accumulator operating with chemical solid state/gas storage reactions with a reaction component comprising:
   a container;
   a solid state/gas reaction storage material arranged in said container, said solid state/gas reaction storage material being chargeable by absorbing heat from a heat carrier gas and releasing said reaction component into said heat carrier gas and dischargeable by incorporating at least a portion of said reaction component introduced into said container and releasing heat into said heat carrier gas;

a support structure within said container, said support structure comprising separate compartments that are open towards said heat carrier gas;

said storage material being permanently arranged in said separate components and divided by into portions within said compartments; and said heat carrier gas flowing directly around said portions of said storage material for releasing said reaction component into and having said reaction component incorporated from the space through which said heat carrier gas flows.

2. Heat accumulator as defined in claim 1, characterized in that said open support structure comprises adjacent compartments separated by walls and said storage material is arranged in said compartments in said configuration in which it is divided into portions.

3. Heat accumulator as defined in claim 2, characterized in that said compartments are adapted to have said heat carrier gas flow through them.

4. Heat accumulator as defined in claim 2, characterized in that said compartments (54) have openings on opposite sides thereof.

5. Heat accumulator as defined in claim 2, characterized in that said support structure includes several elements comprising compartments.

6. Heat accumulator as defined in claim 5, characterized in that said elements have said heat carrier gas flow around them.

7. Heat accumulator as defined in claim 6, characterized in that said elements are arranged in spaced relation to one another in said container.

8. Heat accumulator as defined in claim 7, characterized in that said elements form between them labyrinth-like channels for said heat carrier gas.

9. Heat accumulator as defined in claim 8, characterized in that said elements have said heat carrier gas flow around them one after the other.

10. Heat accumulator as defined in claim 7, characterized in that said elements have said heat carrier gas flow around them parallel to one another.

11. Heat accumulator as defined in claim 1, characterized in that said support structure is made of ceramic material.

12. Heat accumulator as defined in claim 1, characterized in that said support structure is made of metal.

13. Heat accumulator as defined in claim 1, characterized in that the properties of said storage material are such that said reaction component can condense at room temperature.

14. Heat accumulator as defined in claim 1, characterized in that said storage material comprises alkaline oxides or alkaline-earth oxides in the charged state and alkaline hydroxides or alkaline-earth hydroxides in the discharged state.

15. Heat accumulator as defined in claim 1, characterized in that said heat carrier gas exiting from said container during the charging of said storage material is conducted via a condenser for said reaction component.

16. Heat accumulator as defined in claim 1, characterized in that said heat carrier gas fed to said container during the discharging of said storage material flows through a supply device for said reaction component arranged ahead of said container.

17. Heat accumulator as defined in claim 1, characterized in that a supply device is provided for introducing said reaction component into said container during the discharging of said storage material.

18. Heat accumulator as defined in claim 1, characterized in that said heat carrier gas is supplied in a circuit, and in that said reaction component can be removed from and fed to said heat carrier gas in this circuit.

19. Heat accumulator operating with chemical solid state/gas storage reactions with a reaction component comprising:

a container;

a solid state/gas reaction storage material arranged in said container, said solid state/gas reaction storage material being chargeable by absorbing heat from a heat carrier gas and releasing said reaction component into said heat carrier gas and dischargeable by incorporating at least a portion of said reaction component introduced into said container and releasing heat into said heat carrier gas;

a support structure within said container, said support structure comprising separate compartments that are open towards said heat carrier gas;

said storage material being permanently arranged in aid separate compartments and divided into portions within said compartments;

said portions being arranged in planes above each other with several separated portions being arranged on said planes; and said heat carrier gas flowing directly around said portions of said storage material for releasing said reaction component into and having said reaction component incorporated from the space through which said heat carrier gas flows.

* * * * *

UNITED STATES PATENT AND TRADEMARK OFFICE
CERTIFICATE OF CORRECTION

PATENT NO. : 5,184,669
DATED : February 9, 1993
INVENTOR(S) : Tamme, et al.

It is certified that error appears in the above-identified patent and that said Letters Patent is hereby corrected as shown below:

In claim 1, at column 7, line 7, delete the word "by".

In claim 4, at column 7, line 23, delete the reference number "(54)".

In claim 19, at column 8, line 41, "aid" should read -- said -- .

Signed and Sealed this

Ninth Day of November, 1993

Attest:

BRUCE LEHMAN

*Attesting Officer*      *Commissioner of Patents and Trademarks*